Sept. 9, 1941.   S. S. LANGENDORF   2,255,427
FOOD PROCESS
Filed Jan. 16, 1939
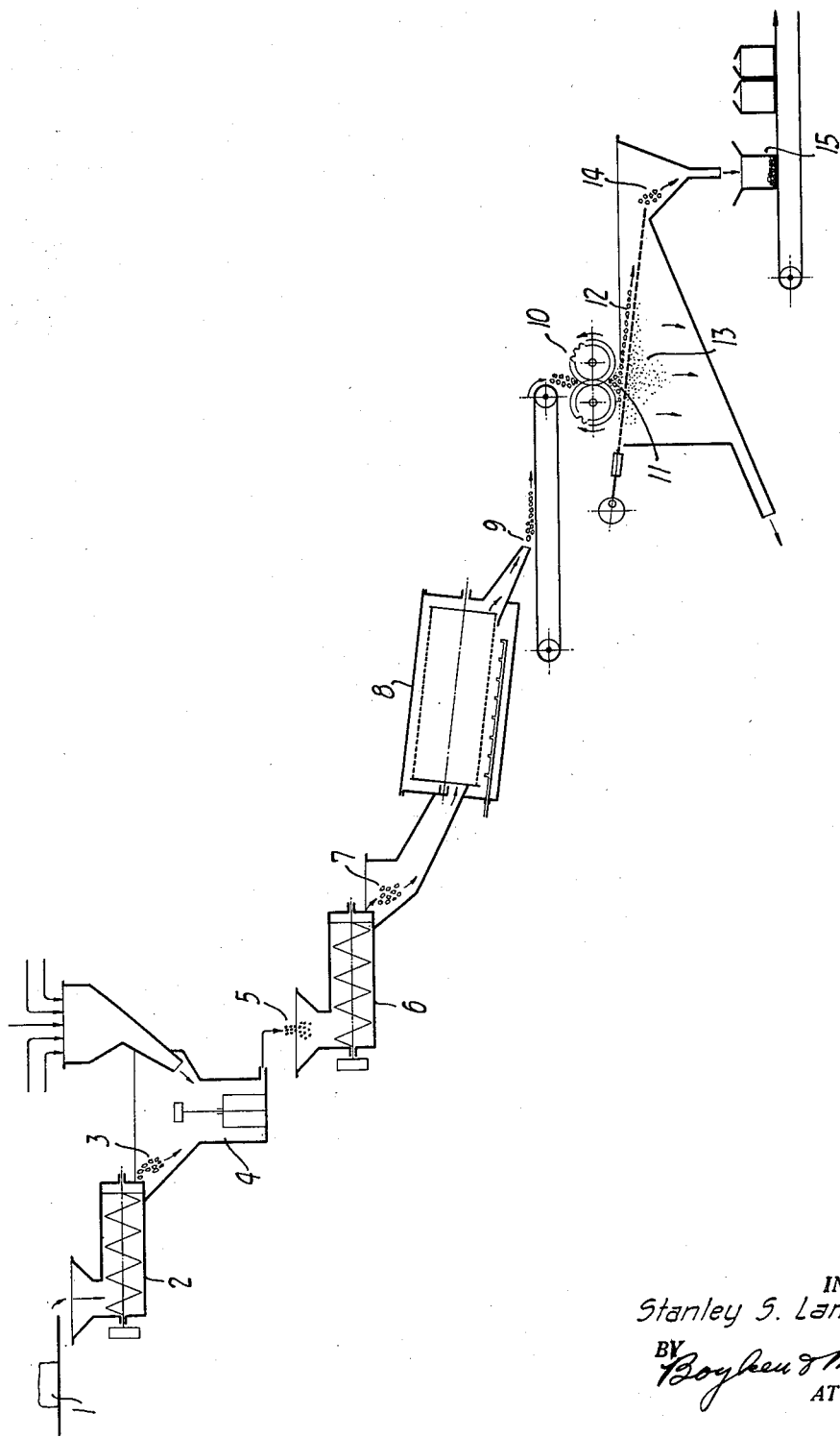
INVENTOR.
Stanley S. Langendorf
BY Boyken & Mohler
ATTORNEYS.

Patented Sept. 9, 1941

2,255,427

UNITED STATES PATENT OFFICE 2,255,427

FOOD PROCESS

Stanley S. Langendorf, San Francisco, Calif.

Application January 16, 1939, Serial No. 251,115

3 Claims. (Cl. 99—83)

This invention relates to food products and has for its main object the manufacture of a nutritious, hard, dry, cereal for human consumption, from the ordinary baked bread of commerce, and which cereal is in the form of small particles suitable for being consumed in a dry state, or with cream, fruits or berries, etc. Other objects will appear in the specification.

The drawing diagrammatically illustrates one method of making the cereal, and which method has been found to be highly satisfactory.

In practice, I preferably use ordinary baked bread, which may be the usual white, rye, bran, wheat, or whole wheat bread, or a mixture of any or all of these, and which bread is allowed to stand at substantially atmospheric temperature, for at least from 36 to 48 hours after baking since its texture is more firm than freshly baked bread, and it is more readily absorbent to the liquids of ingredients used in the process and will not "dough" up when ground or cut into pieces.

My process is substantially continuous, commencing with the baked bread in its natural aged state and finishing with the packaged cereal.

Referring to the drawing, the bread 1 which has preferably been standing for at least from 36 to 48 hours after baking, is first run through a grinder, mill, crumber, or any other suitable device 2 for reducing the bread to small particles. This device reduces the bread to particles 3, which are on the order of crumbs or flakes, and which particles then pass into a mixer 4. This mixer may be in the form of the conventional dough mixer in bakeries. In mixer 4 I add a solution of water, molasses, malt, and sugar. These ingredients may vary as to the proportions used, and others may be added while some may be omitted or substitutions may be made, but a satisfactory formula for 100 lbs. of bread is approximately as follows: 5 lbs. sugar, 5 lbs. malt, 5 lbs. molasses and 15 lbs. water.

After the particles of bread and the other ingredients are fairly well mixed together, and the bread has absorbed most of the liquid of the mixture, I preferably add about 5 lbs. of bran, or oatmeal, or a mixture of both, or other dry, moisture absorbent cereals, which may be designated generally as "cereal meal" and which meal absorbs surplus surface moisture that may be on the particles of bread in the mixer. The mixing continues for a short time to insure a thorough mixing of the bran or oatmeal. The bran or oatmeal adheres to the particles of bread, which are now in the form of relatively large granules 5, as compared to fine crumbs, rather than in the original form in which they entered the mixer, and which granules have absorbed the solution mixed therewith.

The granules 5 then are again passed through a grinder 6, similar to a meat grinder, in which they are compressed together, and ejected as pellets 7. The grinder 5 preferably has the usual screw feed and rotary cutter as in meat grinders.

The pellets 7 then pass into a rotary roaster or oven 8, that generally resembles a trommel in structure, and in which oven the pellets are thoroughly baked, toasted or dextrinized, removing all moisture. The temperature in said oven may vary, say from about 225° F. to 300° F., the important thing being to thoroughly bake or toast the same, as above stated, and the particles after such baking are hard and browned. Generally from 12 to 30 minutes' time in the oven is satisfactory, the exact time being dependent upon variable factors such as temperature, character of mix, etc.

The baked or toasted pellets 9 from said oven are then cooled, after which they are run through a breaker 10, which reduces said particles to a generally uniform size, preferably appreciably larger than coarse bread crumbs, the desired size being determined by adjusting the rolls of the breaker to suit. This size may, of course, vary to meet any unusual demands. The toasted particles are hard and brittle or "crunchy" after passing from the oven, hence some crumbs may be formed during breaking, and therefore the product 11 as it comes from the breaker, may be passed to a crumb separator, if desired, such as a screen 12, where the crumbs 13 may be separated from the desired sized particles 14, the latter passing into package 15 for sealing, while the crumbs 13 may be carried away, or may be passed through the various steps mentioned with other bread, or they may be disposed of in any desired manner.

In certain formulas for the ingredients mixed with the bread, I may use dry or liquid malt, such as malt extract, or any other desired form, and dextrose may comprise the sugar content.

The approximate variations, by weight, of my product, before the moisture has been removed by roasting or dextrinizing, is as follows:

|  | Per cent |
|---|---|
| Bread | 70 to 90 |
| Molasses | 2 to 8 |
| Water | 5 to 20 |
| Dry cereal meal | 3 to 15 |
| Sugar | 2 to 6 |
| Malt | 1 to 6 |

Having described my invention, I claim:

1. The process of making a cereal product that includes the steps of reducing ordinary, baked, cereal-flour bread into relatively small pieces, mixing said pieces with an aqueous solution that includes molasses, bran, sugar, water and malt, until the liquid ingredients are substantially absorbed therein, compressing the pieces resulting from the aforesaid mixing together to form relatively larger pieces of substantially uniform size, roasting said larger pieces until browned and of substantially brittle hardness throughout, breaking the roasted larger pieces into smaller pieces of substantially uniform size, and packaging said smaller pieces for shipment.

2. The process of making a cereal product that comprises the steps of baking loaves of raised, wheat-flour bread, allowing the said bread to stand for at least 36 hours after baking at substantially atmospheric temperature, reducing said bread into relatively small pieces, simultaneously reducing said pieces into granules and flavoring the granules by mixing therewith an aqueous solution of sugar therewith until the solution is substantially all absorbed by said granules, drying the surface moisture of said solution from said granules by mixing a dry, water absorbent cereal with said granules, forming said granules by compression and grinding into larger sized pellets of substantially the same size as said pieces before the first mentioned grinding, roasting said pellets until browned and of substantially brittle hardness throughout, and thereafter reducing said pellets after roasting, into smaller pieces, and thereafter packaging the same for shipment.

3. The process of making a dry breakfast cereal product that includes the steps of reducing loaves of at least day-old raised, baked, bread into relatively small pieces, forming said pieces into individual plastic granules by tumbling and agitating said pieces substantially simultaneously with adding an amount of aqueous sugar solution thereto sufficient to be wholly absorbed by said pieces, moving said granules along a path of travel, compacting the granules together under pressure at a point in said path, releasing the granules so compacted from said compacting pressure, then cutting the compacted granules into pellets of substantially uniform size and thereafter roasting said pellets until the same are browned and of substantially uniform brittleness throughout.

STANLEY S. LANGENDORF.